United States Patent [19]

Udagawa

[11] Patent Number: 5,737,289
[45] Date of Patent: Apr. 7, 1998

[54] DATA RECORDING APPARATUS ADAPTED FOR RECORDING DATA SIGNALS ONTO AN OPTICAL RECORDING MEDIUM

[75] Inventor: Osamu Udagawa, Kanagawa, Japan

[73] Assignee: Sony Corporation, Tokyo, Japan

[21] Appl. No.: 586,703

[22] PCT Filed: May 31, 1995

[86] PCT No.: PCT/JP95/01067

§ 371 Date: Jan. 26, 1996

§ 102(e) Date: Jan. 26, 1996

[87] PCT Pub. No.: WO95/33261

PCT Pub. Date: Dec. 7, 1995

[30] Foreign Application Priority Data

May 31, 1994  [JP]  Japan .................................. 6-141109

[51] Int. Cl.⁶ ........................................................ G11B 7/00
[52] U.S. Cl. ................................................ 369/54; 369/116
[58] Field of Search ............................ 369/54, 116, 58, 369/59, 47, 50, 44.26

[56] References Cited

U.S. PATENT DOCUMENTS

| | | |
|---|---|---|
| 4,631,713 | 12/1986 | Romeas et al. ........................ 369/54 |
| 5,175,719 | 12/1992 | Iimura . | |
| 5,226,027 | 7/1993 | Bakx ........................................ 369/58 |
| 5,305,296 | 4/1994 | Kono ....................................... 369/54 |
| 5,563,862 | 10/1996 | Udagawa ................................ 369/54 |
| 5,592,463 | 1/1997 | Muramatsu et al. .................... 369/54 |

FOREIGN PATENT DOCUMENTS

| | | |
|---|---|---|
| 5-12669 | 1/1993 | Japan . |
| 5-166190 | 7/1993 | Japan . |
| 6-89436 | 3/1994 | Japan . |

*Primary Examiner*—Thang V. Tran
*Attorney, Agent, or Firm*—Limbach & Limbach L.L.P.; Seong-Kun Oh

[57] ABSTRACT

In this invention, a partition within a test write area on an optical disc is divided into a plurality of sub-partitions to record test write data by different plural recording laser drive powers within respective subcode frames constituting the sub-partitions to determine an optimum laser drive power for recording from an average value of asymmetry values obtained by reproducing respective data recorded by the plural laser drive powers, thereby making it possible to carry out OPC operations of which number is more than 100 which is the maximum number of the OPC operations in the prior art. Accordingly, also in the case where data recording operations more than the maximum number of the conventional data recording operations, i.e., 100 times of operations are carried out, it is possible to maintain quality of recording data.

24 Claims, 17 Drawing Sheets

| NO. OF BITS | 4 | 8 | 8 | 8 | 14 |
|---|---|---|---|---|---|
| BIT POSITION | 0<br>1234 | 111<br>56789012 | 11111112<br>34567890 | 22222222<br>12345678 | 23333333333444<br>90123456789012 |
| DATA | SYNC | MIN | SEC | FRAME NO.FM | ERROR DETECTION CODE CRC |

FIG.8

DATA RECORDING APPARATUS ADAPTED FOR RECORDING DATA SIGNALS ONTO AN OPTICAL RECORDING MEDIUM

TECHNICAL FIELD

This invention relates to a data recording apparatus adapted for recording data signals onto an optical recording medium.

BACKGROUND ART

Hitherto, as data recording apparatuses adapted for recording data signals onto an optical recording medium, there are optical disc apparatuses adapted to irradiate laser beams onto a disc-shaped recording medium to successively form pits so that information can be recorded. As the optical disc apparatus of this kind, there is, e.g., a CD-R (CD-Recordable) drive unit in conformity with the standard of the so-called CD (Compact Disc).

The optical disc used in this CD-R drive unit is the so-called write-once type optical disc such that high intensity laser beams are irradiated so that the optical property of the recording layer between pre-grooves serving as a guide groove formed in advance is changed, thus permitting information to be recorded only once.

The recording format of the optical disc used in this CD-R drive unit is shown in FIGS. 1 and 2. At this optical disc, a program area PG for recording speech data, etc. is provided. At the inner circumferential side of the program area PG, a lead-in area LI including TOC (Table of Contents) is provided. At the outer circumferential side of the program area PC, a lead out area LO is provided. Further, at the inner circumferential side of the lead in area LI, a program memory area PMA for recording the recording state of the program area PG and a power control area PCA for controlling (adjusting) the laser drive power are provided. The area from the power control area PCA up to the lead out area LO is called an information area IA.

When the center of the optical disc is assumed to be C, standardization is made such that the diameter $R_5$ of the optical disc is 120 mm, the diameter $R_4$ up to the outermost circumference of the lead out area LO is 118 mm, and the diameter $R_3$ up to the innermost circumference of the lead out area LO is 116 mm. Moreover, standardization is made such that the diameter $R_2$ up to the innermost circumference of the program area PG is about 50 mm, and the diameter $R_1$ up to the innermost circumference of the lead in area $L_I$ is about 46 mm. Thus, the distance $L_I$ of the lead in area $L_I$ is about 4 mm. In addition, the diameter $R_6$ up to the innermost circumference of the power control area PCA is about 44.87 mm.

The start time $t_3$ of the lead in area LI and the start time $t_5$ of the lead out area LO of the optical disc shown in FIG. 2 are times obtained from absolute address information signal recorded in advance on the optical disc, which are called ATIP (Absolute Time In Pre-groove). With the start time $t_3$ of the lead in area LI being as reference, end time $t_4$ of the lead in area LI, start time $t_2$ of the program memory area PMA and start time $t_1$ of the power control area PCA are respectively determined. Moreover, when the start time $t_3$ of the lead in area LI is assumed as 0 min. 0 sec. 0 frame, and is represented by 00:00:00, the start time $t_1$ of the power control area PCA and the start time $t_2$ of the program memory area PMA are respectively represented as ($t_3$–00:35:65) and ($t_3$–00:13:65) by the time series. It is to be noted that the end time $t_4$ of the lead in area LI is also defined as a time obtained by subtracting the time corresponding to one sub code frame from the start time of the program area PG, and the end time $t_4$ of the lead in area LI can be represented by 99:59:74.

Moreover, the power control area PCA consists of a test write area TA and a count area CA as shown in FIG. 3. The test write area TA and the count area CA are areas used for OPC (Optimum Power Control) operation carried out prior to recording of data, i.e., calibration operation of the laser drive power. The test write area TA has a size corresponding to 1500 subcode frames, and the count area CA has a size corresponding to 100 subcode frames. In this case, the subcode frame is a frame of 1/75 seconds in terms of the reference linear velocity, which consists of sync (synchronization) signal, subcode, audio data and parity.

This test write area is divided into 100 areas, wherein respective divided areas are called partition. Namely, one partition of the test write area TA consists of 15 subcode frames. The count area CA is also divided into 100 areas similarly to the test write area TA, wherein respective divided areas are called partition. One partition of the count area CA is the area corresponding to one subcode frame. The OPC operation is carried out with respective partitions of the test write area TA and the count area CA being as unit.

The OPC operation will now be described. In the OPC operation, recording state of recognition data recorded in the partition within the count area CA is initially detected. Namely, the partition in which recognition data is recorded by the last OPC operation is detected. Then, the partition within the test write area TA corresponding to the detected partition of the count area CA is detected to thereby detect the partition within the test write area TA where test write data is to be recorded by the current OPC operation. Then, test write data which have been read out from the memory are recorded while sequentially switching output of the recording laser drive power as shown in FIG. 4 every respective subcode frames within the corresponding partition.

Further, asymmetry values are respectively detected from RF signals obtained by reproducing test write data recorded by different laser drive powers. An optimum asymmetry value is selected from the detected plural asymmetry values to determine, as the optimum laser drive power for recording, the laser drive power when test write data which takes the optimum asymmetry value is recorded. Thereafter, random data is recorded, as identification data, into the partition within the count area CA corresponding to the partition within the test write area TA where the test write data is recorded. It is to be noted that, in recording of data with respect to respective partitions within the test write area TA and the count area CA, data are recorded from the inner circumferential side of the optical disc toward the outer circumferential side thereof.

In the case where identification data ape recorded up to the third partition within the count area CA as shown in FIG. 3, for example, by the above-mentioned OPC operation, it is detected that recording of test data, i.e., test write data up to the third partition within the test write area TA is carried and the partitions up to the third partition are already used.

At this time, when the lead in area LI is represented by ($T_{st}$–00:00:00) where the start time thereof is $T_{st}$, the count area CA is represented by ($T_{st}$–00:13:25)~($T_{st}$–00:15:05) and the test write area TA is represented by ($T_{st}$–00:15:05) ~($T_{st}$–00:35:65), wherein the first partition of the count area CA is represented by ($T_{st}$–00:13:55), the third partition of the count area CA is represented by ($T_{st}$–00:13:58), the first partition of the test write area TA is represented by ($T_{st}$–

00:15:35), and the third partition of the test write area TA is represented by ($T_{sf}$–00:16:05). In this case, the program memory area PMA is represented by ($T_{sf}$–00:00:00)~($T_{sf}$–00:13:25), and, in the program memory area PMA, the area indicating recorded area of data within the program area PG when the test write area TA and the count area CA are in the above-described recording state is represented by ($T_{sf}$–00:12:50)~($T_{sf}$–00:13:25).

As stated above, respective partitions within the count area CA and respective partitions within the test write area TA have one-to-one correspondence relationship. By one OPC operation, respective one partition within the test write area TA and the count area CA are used. At this time, if data has been already recorded in a certain partition within the count area CA, it is indicated that the partition within the test write area TA corresponding to that partition has been already used.

A more practical signal generation at the time of recording and at the time of reproduction of data will be described below.

At the time of data recording, EFM (Eight to Fourteen Modulation) is implemented to recording data to thereby generate a modulated signal B1 in which occurrence probabilities of logic 0 (level) and logic 1 (level) are equal to each other as indicated by A of FIG. 5. Laser beams are emitted from the laser diode with the modulated signal B1 being as reference. As a result, laser beams are intermittently irradiated onto the optical disc in correspondence with the logic level of the modulated signal B1. Thus, areas having low reflection factor, i.e., pits are formed at the recording layer between pre-grooves. At this time, the laser diode is driven by high output.

The modulated signal B1 is generated so that H level and L level are continuous within the range of periods 3T~11T with the reference period T being as reference. Thus, as indicated by B of FIG. 5, pits P are successively formed so that data are recorded. In this case, areas having high reflection factor where no pit P is formed are called land.

Moreover, at the time of reproduction of data, the laser diode is driven by low output to irradiate the emitted laser beams onto the optical disc. A reflected light from the optical disc to which laser beams are irradiated is received by the photodetector. Reproduction signal, i.e., RF signal of which signal level changes as indicated by C of FIG. 5 in accordance with light quantity of the reflected light can be obtained. By detecting the signal level of the RF signal with the slice level SL being as reference, reproduction data D1 indicated by D of FIG. 5 is detected.

At this time, modulated signal B1 is generated by EFM. Since occurrence probabilities of logic 0 and logic 1 are equal to each other, slice level SL is selected so that occurrence probabilities of logic 0 and logic 1 are equal to each other also in the reproduction data D1.

On the contrary, at the time of data recording, even if the laser diode is driven by fixed power so that laser beams are emitted, size of pit changes in dependency upon change of the ambient temperature and change of laser wavelength, etc.

For this reason, at the time of data recordings as described above, in the OPC operation, drive power of the laser diode is successively switched to record test write data into the test write area TA of the optical disc to reproduce the test write data to detect asymmetry values Asy at respective laser drive powers. These asymmetry values Asy are simply detected by using an asymmetry detecting circuit. Then, an asymmetry value Asy closest to the asymmetry value Asy determined in advance is selected from these detected asymmetry values Asy. Thus, the drive power when the selected asymmetry value Asy is obtained is determined as an optimum value of the drive power of the laser diode.

The asymmetry value mentioned above represents a ratio of time mean between pits and lands. In more practical sense, the RF signal reproduced from the optical disc has a waveform as shown in FIG. 6, and is represented by the relationship between the slice level SL in which occurrence probabilities of logic "0" and logic "1" are equal to each other with respect to the reproduction data D1 indicated by D of FIG. 5 and the peak level and the bottom level of the reproduction signal. Namely, the asymmetry value Asy can be represented by the following formula (1) by using the peak level $X_1$ and the bottom level $X_4$ of the signal of the pulse width of the period 11T, and the peak level $X_2$ and the bottom level $X_3$ of the signal of the pulse width of the period 3T.

$$Asy = \frac{\frac{X_2 + X_3}{2} - \frac{X_1 + X_4}{2}}{X_1 - X_4} \tag{1}$$

In recording data with respect to the optical disc, an approach is employed to implement, with respect to a single optical disc, with music data of one piece of music, i.e., data of one track being as unit, Disc at once operation to once record data of plurality of tracks, track write once operation to carry out recording every data of one track, or intratrack write once operation (write once operation within track) to carry out so called packet recording to record packet data which are divided data obtained by dividing data of one track into several data portions, thus to record data of one piece of music.

As described above, in carrying out data recording, single OPC operation is carried out. In this single OPC operation, one partition within the test write area TA is used. Since the number of partitions within the test write area TA is 100, the number of OPC operations which can be carried on a single optical disc is as large as 100 at the maximum. In accordance with the existing standard (specification), the number of maximum tracks which can be recorded onto a single optical disc is set to 99. Accordingly, in the case of carrying out only one (once) recording operation or track write once operation, there is no possibility that the number of data recording operations reaches 100 or more. Accordingly, even if the number of OPC operations which can be carried out is as large as 100, there is no problem in the data recording operation.

However, since the maximum number of tracks for a single optical disc is 99 in the intratrack write once operation, there are instances where when carrying out data recording by the intratrack write once operation, the number of data recording operations may be equal to 100 or more. However, in the case where the conventional OPC operation is used, OPC operations of 100 times or more cannot be conducted. Accordingly, in the data recording operations numbering 100 times or more, data recording would be carried out without carrying out the OPC operation. As a result, the quality of the recorded data would be lower than the quality of data recorded after undergone the OPC operation.

This invention has been made in view of actual circumstances as stated above, and its object is to provide a data recording apparatus which can carry out 100 times of OPC operations or more in a single optical disc.

DISCLOSURE OF THE INVENTION

This invention has been proposed in order to attain the above-described object, and a data recording apparatus according to this invention is characterized in that it comprises laser irradiating means for irradiating laser beams with respect to an optical recording medium, laser driving means for driving the laser irradiating means, moving means for relatively moving the laser irradiating means with respect to the optical recording medium, and control means for controlling the laser driving means and the moving means so that test write data can be recorded by different plural laser drive powers within respective subcode frames of a test write area including the plurality of subcode frames within the optical recording medium by the laser irradiating means.

Moreover, the data recording apparatus according to this invention is characterized in that the test write area comprises a plurality of partitions constituted with the plurality of subcode frames, and that the optical recording medium further comprises a count area having a plurality of sub-areas respectively associated with the plurality of partitions of the test write area, wherein the control means controls the laser driving means and the moving means so as to record identification data indicating that the partition has been already used into the sub-area within the count area associated with the partition into which the test write data is recorded.

Moreover, respective sub-areas constituting the count area are characterized in that they are an area corresponding to the one subcode frame.

Further, the data recording apparatus according to this invention is characterized in that it further comprises light receiving means for receiving laser beams reflected from the optical recording medium, and detecting means for detecting presence or absence of recording of identification data of the count area in accordance with an output from the light receiving means, and wherein the control means controls the laser driving means and the moving means on the basis of a detection result from the detecting means so as to record test write data into the sub-area, which is not yet recorded, of the test write area.

Further, the control means is characterized in that the control means controls the detecting means to detect whether or not identification data is recorded in the sub-area within the count area associated with the partition including a certain subcode frame prior to recording of the test write data into the subcode frame within the trial write area, and controls the laser driving means and the moving means so as to record identification data into the sub-area within the count area associated with the partition including the subcode frame into which the test write data is to be recorded when no identification data is recorded in the sub-area.

Further, the data recording apparatus according to this invention is characterized in that the partition of the test write area includes a plurality of sub-partitions, and that it further comprises memory means for detecting recording state of identification data of the sub-area within the count area to detect use state of the sub-partition within the partition of the test write area on the basis of the detected recording state, thus to store use state of the detected sub-partition.

Further, the control means is characterized in that the control means controls the laser driving means and the moving means to record identification data into the sub-area within the count area associated with the partition including a certain subcode frame after test write data is recorded into the subcode frame.

Further, the data recording apparatus according to this invention is characterized in that it further comprises light receiving means for receiving laser beams reflected from the optical recording medium, and reproducing means for reproducing, on the basis of an output from the light receiving means, sync (synchronization) signals recorded every predetermined unit on the optical recording medium and data recorded on the optical recording medium, and wherein the control means controls the laser driving means so that the laser drive power is changed stepwise at a time interval which is substantially 1/N (N is integer equal to 2 or more) of a time interval between two successive sync signals, on the basis of an output from the reproducing means.

Further, the sync signal obtained from the reproducing means is characterized in that it is included in an absolute address information signal recorded in advance on the optical recording medium.

Further, the control means is characterized in that it resets variable timing of the laser drive power in accordance with the timing of a sync signal obtained from the reproducing means.

Further, the data recording apparatus according to this invention is characterized in that it further comprises light receiving means for receiving laser beams reflected from the optical recording medium and asymmetry detecting means for detecting asymmetry value of the test write data on the basis of an output of test write data recorded in the test write area from the light receiving means, and wherein the control means controls laser drive power provided to the laser driving means on the basis of an output from the asymmetry value detecting means when recording data onto the optical recording medium.

Further, a data recording apparatus according to this invention is characterized in that it comprises laser irradiating means for irradiating laser beams with respect to an optical recording medium having a test write area including a plurality of partitions constituted with a plurality of subcode frames, laser driving means for driving the laser irradiating means, moving means for relatively moving the laser irradiating means with respect to the optical recording medium, and control means for controlling the laser driving means and the moving means so as to record test write data by plural laser drive powers different from each other within respective sub-partitions of one test write area.

Further, the optical recording medium is characterized in that it further comprises a count area including a plurality of sub-areas respectively associated with a plurality of partitions of the test write area, and wherein the control means controls the laser driving means and the moving means so as to record identification data indicating that the partition has been already used into the sub-area within the count area associated with the partition into which the test write data is recorded.

Further, the data recording apparatus according to this invention is characterized in that it further comprises light receiving means for receiving laser beams reflected from the optical recording medium and detecting means for detecting presence or absence of recording of identification data of the count area, and wherein the control means controls the laser driving means and the moving means so as to record test write data into the sub-area, which is not yet recorded, of the test write area on the basis of a detection result from the detecting means.

Further, the control means is characterized in that the control means controls the detecting means to detect whether or not identification data is recorded in the sub-area within the count area associated with the partition including a certain subcode frame prior to recording of the test write data into the subcode frame within the test write area, and controls the laser driving means and the moving means so as to record identification data into the sub-area within the count area associated with the partition including the subcode frame into which the test write data is to be recorded when no identification data is recorded in the sub-area.

Further, the data recording apparatus according to this invention is characterized in that it comprises memory means for detecting recording state of identification data of the sub-area within the count area to detect use state of the sub-partition within the partition of the test write area on the basis of the detected recording state, thus to store use state of the detected sub-partition.

Further, the data recording apparatus according to this invention is characterized in that it further comprises light receiving means for receiving laser beams reflected from the optical recording medium and reproducing means for reproducing sync signals recorded every predetermined unit on the optical recording medium and data recorded on the optical recording medium on the basis of an output from the light receiving means, and wherein the control means controls the laser driving means so that the laser drive power is changed stepwise at a time interval which is substantially 1/N (N is integer equal to 2 or more) of a time interval between successive two sync signals on the basis of an output from the reproducing means.

Further, the data recording apparatus according to this invention is characterized in that it further comprises light receiving means for receiving laser beams reflected from the optical recording medium, and asymmetry detecting means for detecting asymmetry value of the test write data on the basis of an output of test write data recorded in the test write area from the light receiving means, and wherein the control means controls laser drive power provided to the laser driving means on the basis of an output from the asymmetry value detecting means when recording data onto the optical recording medium.

Further, a data recording apparatus according to this invention is characterized in that it comprises laser irradiating means for irradiating laser beams with respect to an optical recording medium, laser driving means for driving the laser irradiating means, moving means for relatively moving the laser irradiating means with respect to the optical recording medium, and control means for controlling the laser driving means and the moving means so that test write data are recorded by different plural laser drive powers within respective sub-areas of a test write area including a plurality of sub-areas within the optical recording medium by the laser irradiating means.

Further, the data recording apparatus according to this invention is characterized in that the test write area includes a plurality of divided areas constituted with a plurality of sub-areas, and that the optical recording medium further comprises a count area including a plurality of sub-areas respectively associated with the plurality of divided areas of the test write area, and wherein the control means controls the laser driving means and the moving means so as to record identification data indicating that the divided area has been already used into the sub-area within the count area associated with the divided area into which the test write data is recorded.

Further, respective sub-areas constituting the count area are characterized in that they are an area of one sub-area of the test write area.

Further, the data recording apparatus according to this invention is characterized in that it further comprises light receiving means for receiving laser beams reflected from the optical recording medium, and detecting means for detecting presence or absence of recording of identification data of the count area in accordance with an output from the light receiving means, and wherein the control means controls the detecting means to detect whether or not identification data is recorded in the sub-area within the count area associated with the divided area including a certain sub-area prior to recording of the test write data into the sub-area within the test write area, and controls the laser driving means and the moving means so as to record identification data into the sub-area within the count area associated with the divided area including the sub-area into which the test write data is to be recorded when no identification data is recorded in the sub-area.

Further, the data recording apparatus according to this invention is characterized in that it further comprises light receiving means for receiving laser beams reflected from the optical recording medium, and reproducing means for reproducing, on the basis of an output from the light receiving means, sync signals recorded every predetermined unit on the optical recording medium and data recorded on the optical recording medium, and wherein the control means controls the laser driving means so that the laser drive power is changed stepwise at a time interval which is substantially 1/N (N is integer equal to 2 or more) of a time interval between successive two sync signals on the basis of an output from the reproducing means.

In addition, the data recording apparatus according to this invention is characterized in that it further comprises light receiving means for receiving laser beams reflected from the optical recording medium, and asymmetry detecting means for detecting asymmetry value of the test write data on the basis of an output of the test write data recorded in the test write area from the light receiving means, and wherein the control means controls laser drive power provided to the laser driving means on the basis of an output from the asymmetry value detecting means when recording data onto the optical recording medium.

BRIEF DESCRIPTION OF THE DRAWINGS

FIG. 8 is a view showing the format of the ATIP frame.

BEST MODE FOR CARRY OUT THE INVENTION

A preferred embodiment of a data recording apparatus according to this invention will now be described with reference to the attached drawings.

Figure 1:
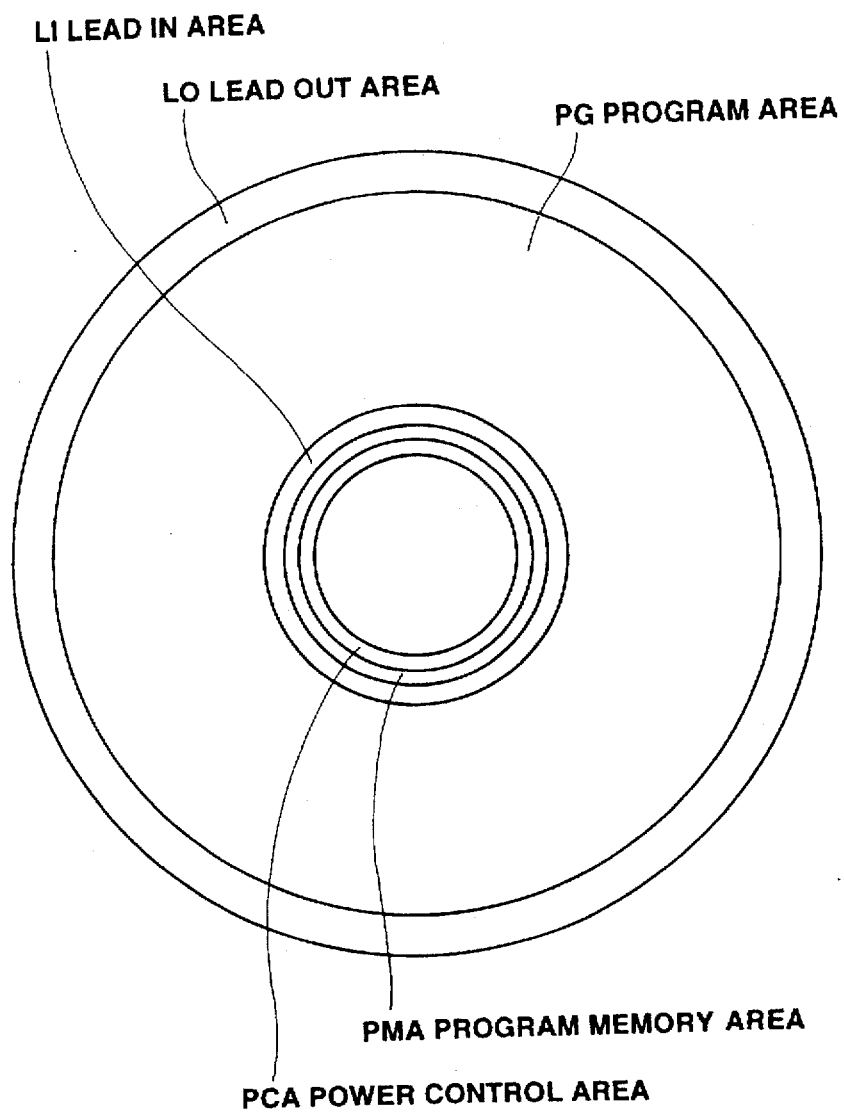
FIG. 1 is a view showing outline of the recording format of an optical disc.
Figure 2:
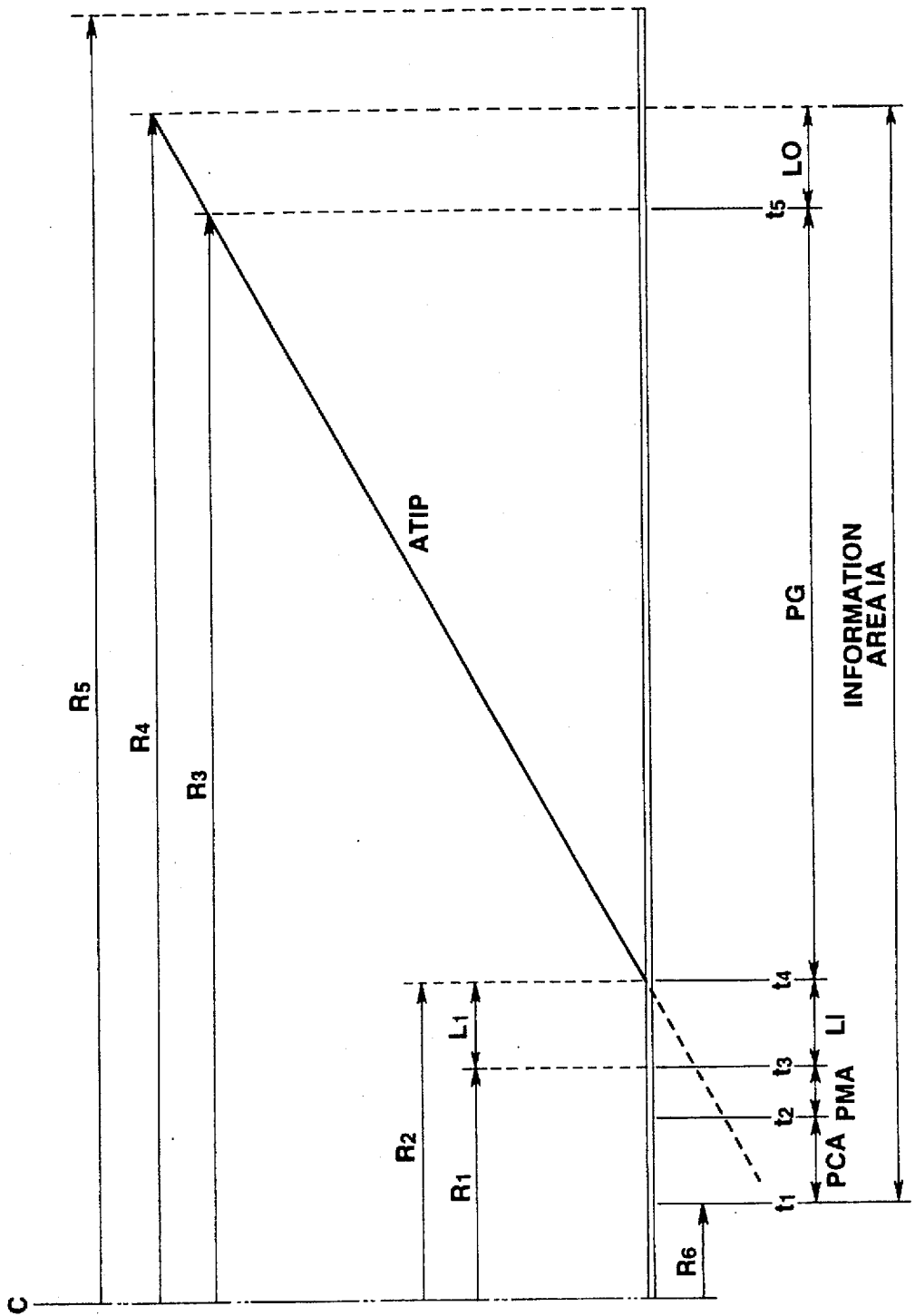
FIG. 2 is a view showing, in more practical sense, the recording format of the optical disc.
Figure 3:
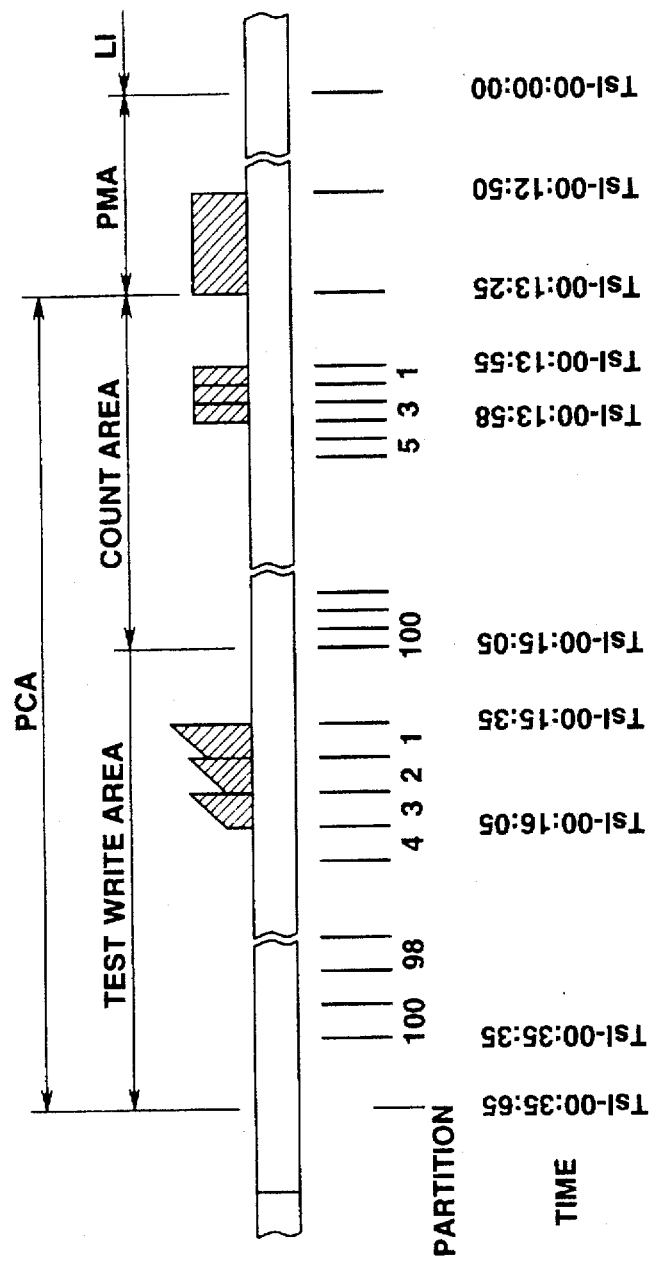
FIG. 3 is a view for explaining, in more practical sense, power control area.
Figure 4:
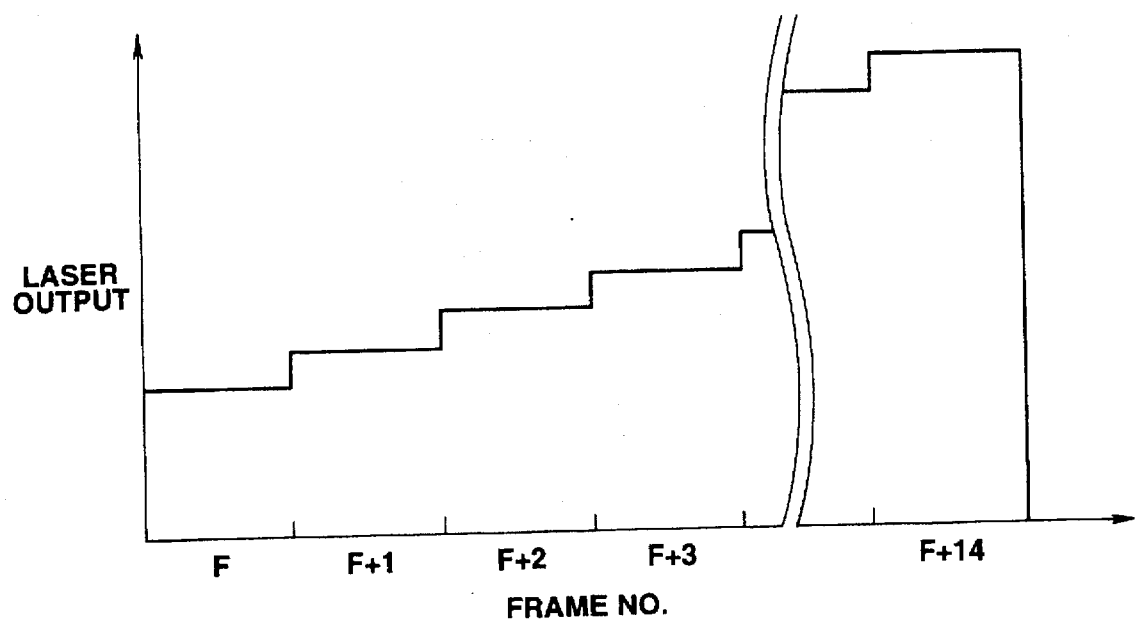
FIG. 4 is a view showing output of laser drive power with respect to respective subcode frames at the time of conventional OPC operation.
Figure 5A:
FIGS. 5A–5D are views showing respective signal waveforms, etc. at the time of recording and at the time of reproduction of data.
Figure 5B:
Figure 5C:
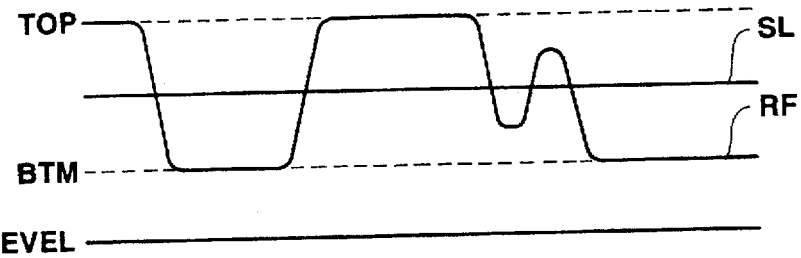
Figure 5D:
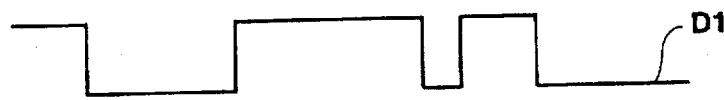
Figure 6:
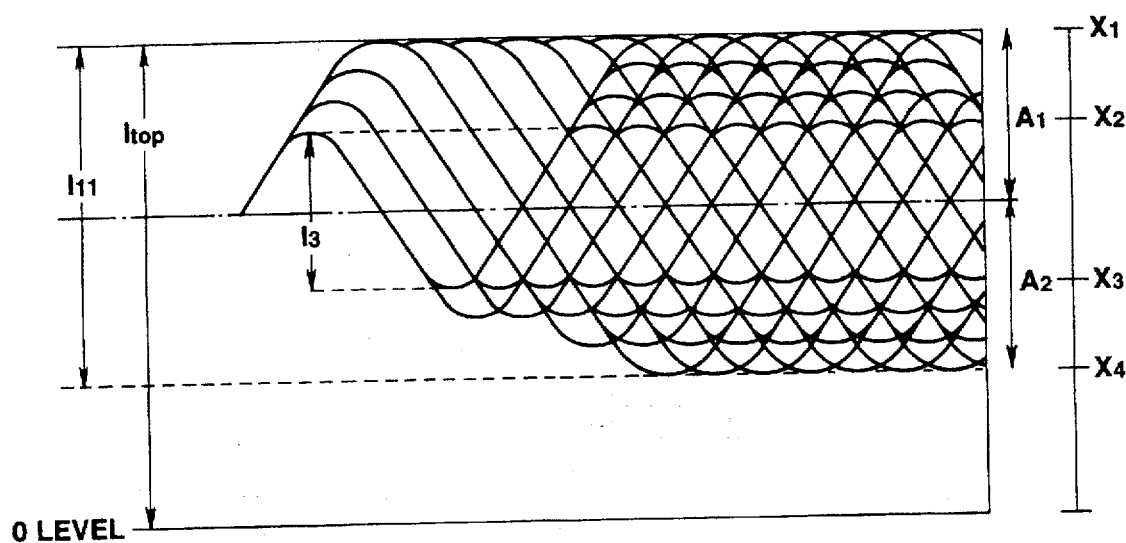
FIG. 6 is a view showing asymmetry value of RF signal.
Figure 7:
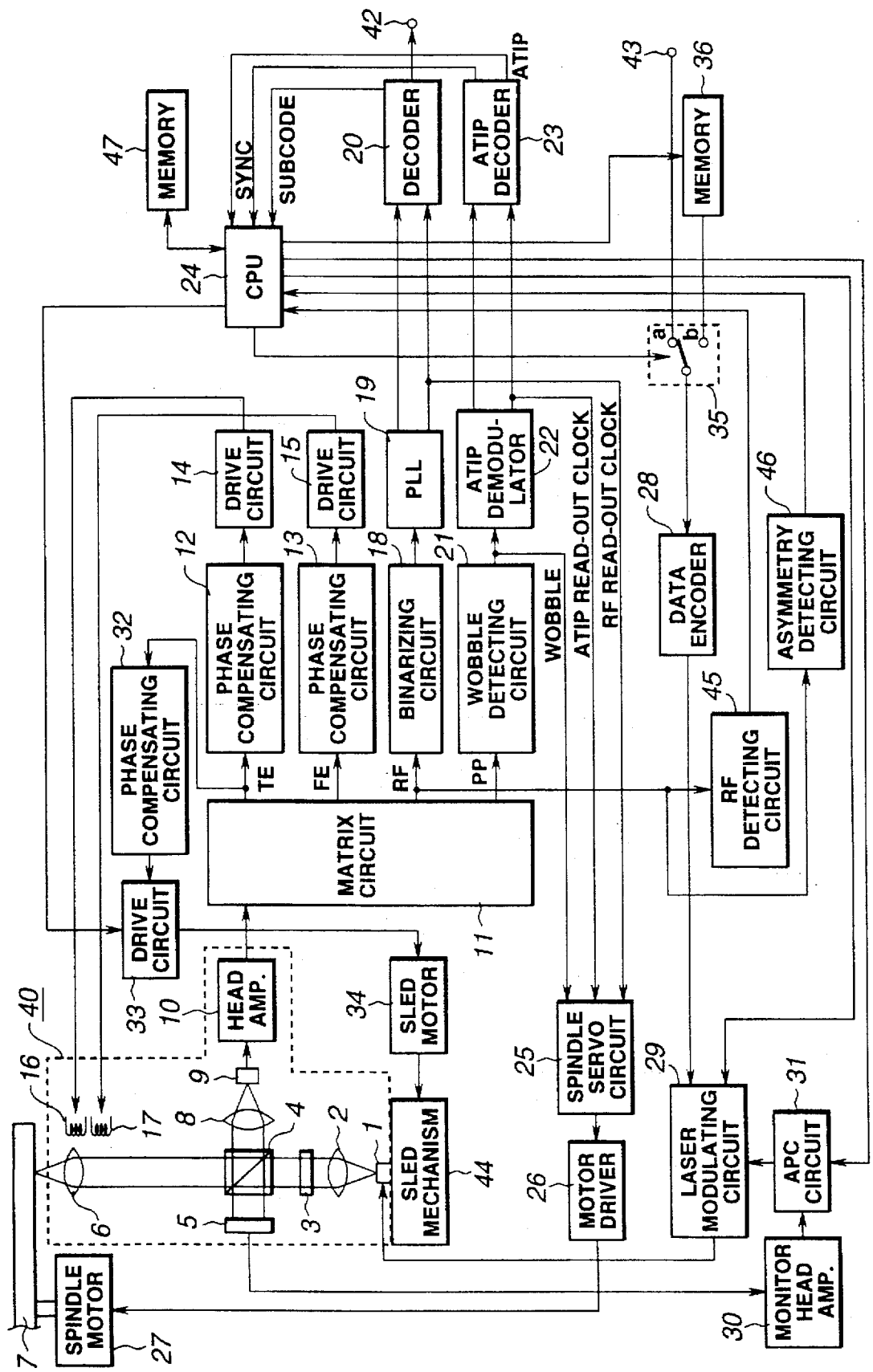
FIG. 7 is a block diagram showing outline of a data recording apparatus according to this invention.

Outline of the block diagram of the data recording apparatus is shown in FIG. 7. This data recording apparatus is directed to a data recording apparatus adapted for recording data signals with respect to an optical disc 7 which is the optical recording medium. This data recording apparatus comprises a laser diode 1 which is laser irradiating means for irradiating laser beams with respect to the optical disc 7, a laser modulating circuit 29 which is laser driving means for driving the laser diode 1, a sled mechanism 44 which is moving means for relatively moving the laser diode 1 with respect to the optical disc 7, a photodetector 9 which is light receiving means for receiving laser beams reflected from the optical disc 7, a RF detecting circuit 45 which is detecting means for detecting presence or absence of recording of identification data of the count area in accordance with an output from the photodetector 9, reproducing means for reproducing, on the basis of an output from the photodetector 9, sync (synchronization) signals recorded every predetermined unit on the optical disc 7 and data recorded on the optical disc 7, an asymmetry detecting circuit 46 which is asymmetry detecting means for detecting asymmetry value of the test write data on the basis of an output of test write data recorded in the test write area from the photodetector 9, and a CPU 24 for controlling the laser modulating circuit 29 and the sled mechanism 44 so that test write data can be recorded by different plural laser drive powers within respective subcode frames of the test write area consisting of a plurality of subcode frames within the optical disc 7.

In FIG. 7, laser beams emitted from the laser diode 1 are changed into (rays of) parallel light by a collimation lens 2. The parallel light thus obtained is guided to an objective (object lens) 6 through a grating 3 and a beam splitter 4, and is converged onto the optical disc 7 by the objective 6.

Moreover, a portion of light beams incident to the beam splitter 4 is separated by the beam splitter 4, and is incident to a laser monitor 5. The light beams incident to the laser monitor 5 are caused to undergo photoelectric conversion so that a current value corresponding to light quantity can be obtained. This current value is sent to a monitor head amplifier 30, at which it is converted (translated) into a voltage value. The voltage value thus obtained is further sent to an Automatic Power Control (APC) circuit 31.

This APC circuit 31 serves to carry out, by using a signal from the monitor head amplifier 30, a control so that emitted light quantity of laser beams from the laser diode 1 is fixed without being affected by disturbance such as temperature, etc. A control signal from the APC circuit 31 is sent to the laser modulating circuit 29. This laser modulating circuit 29 drives the laser diode 1 by laser drive power based on a control signal from the APC circuit 31.

A reflected light of laser beams irradiated onto the optical disc 7 is incident to the beam splitter 4 through the objective 6. This beam splitter 4 guides the reflected light to a multi-lens 8. This multi-lens 8 consists of cylindrical lens and converging (condensing) lens, etc., and serves to converge the reflected light onto a photodetector 9.

An output from the photodetector 9 is converted into a voltage value by a head amplifier 10. The voltage value thus obtained is outputted to a matrix circuit 11. This matrix circuit 11 carries out additive/subtractive operation of outputs from the head amplifier 10. Thus, a tracking error signal TE, a focus error signal FE, and a push-pull signal PP are generated. The tracking error signal TE and the focus error signal FE are respectively sent to phase compensating circuits 12, 13.

The tracking error signal TE of which phase has been adjusted at the phase compensating circuit 12 is sent to a drive circuit 14. This drive circuit 14 operates a tracking actuator 16 on the basis of the tracking error signal TE from the phase compensating circuit 12. Thus, tracking control with respect to the optical disc 7 of the objective 6 is carried out.

Moreover, the focus error signal of which phase has been adjusted at the phase compensating circuit 13 is sent to a drive circuit 15. This drive circuit 15 operates a focus actuator 17 on the basis of the focus error signal FE from the phase compensating circuit 13. Thus, focus control with respect to the optical disc 7 of the objective 6 is carried out.

Further, the lower frequency band component of the tracking error signal TE is sent to a sled phase compensating circuit 32, at which it is caused to undergo phase compensation. The phase-compensated signal thus obtained is sent to a drive circuit 33. This drive circuit 33 drives a sled motor 34 by using the signal from the sled phase compensating circuit 32. Thus, position of the sled mechanism 44 is caused to undergo movement control.

The push-pull signal outputted from the matrix circuit 11 is outputted to a wobble detecting circuit 21. At this wobble detecting circuit 21, a wobble signal formed in advance along the physical track of the optical disc 7 is detected. The wobble signal thus detected is outputted to an ATIP demodulator 22. At this ATIP demodulator 22, ATIP information and an ATIP read-out clock signal ape detected from the wobble signal.

This ATIP information is time obtained from an absolute address information signal recorded in advance on the optical disc 7 as described above, and consists of frame units having length equal to subcode frame of 1/75 sec. in terms of the reference linear velocity. This frame is called ATIP frame, and has the format shown in FIG. 8. In more practical sense, this ATIP frame consists of synchronization signal of 4 bits, called SYNC, minute MIN, second SEC and frame No. FM of respective 8 bits, and error detection code CRC of 14 bits. In addition, the above-mentioned minute MIN, second SEC and frame No. FM are represented by binary number, and indicate various information by combination of respective Most Significant Bits (MSB), i.e., bit 5, bit 13 and bit 21.

The ATIP information and the ATIP read-out clock signal are sent to an ATIP decoder 23. At this ATIP decoder 23, address information is reproduced by using the ATIP information and the ATIP read-out clock signal. This address information is delivered to the CPU 24.

The wobble signal detected at the wobble detecting circuit 21 and the ATIP read-out clock signal detected at the ATIP demodulator 22 are outputted also to a spindle servo circuit 25. This spindle servo circuit 25 drives a spindle motor 27 through a motor driver 26 by using the wobble signal and the ATIP read-out clock signal. At this time, the spindle servo circuit 25 carries out a control so that the wobble signal detected at the wobble detecting circuit 21 has a fixed frequency of 22.05 kHz, or carries out a control so that the ATIP read-out clock signal outputted from the ATIP modulator 22 has a fixed frequency of 6.35 kHz.

The RF signal outputted from the matrix circuit 11 is sent to a binarizing (binarization) circuit 18, where it is binarized (changed into a binary signal). The signal thus obtained is sent to a PLL circuit 19 as a binary signal. At this PLL circuit 19, a clock signal is generated from the binary signal. This clock signal is sent to a decoder circuit 20 along with the binary signal. The decoder circuit 20 decodes the binary signal on the basis of the clock signal. Thus, the data signal and the subcode are reproduced. The data signal thus reproduced is outputted from an output terminal 42. In addition, the subcode is sent to the CPU 24.

Moreover, the clock signal reproduced at the PLL circuit is inputted to the spindle servo circuit 25, at which it is compared with the reference clock signal. Then, the comparison output is sent to the motor driver 26 as a rotation error signal. This motor driver 26 controls driving of the spindle motor 27 on the basis of the rotation error signal.

It is to be noted that the above-described operation is carried out both at the time of reproduction of data from the optical disc 7 and at the time of recording of data onto the optical disc 7.

Further, at the time of recording data onto the optical disc 7, the RF detecting circuit 45 reproduces data of a predetermined area on the optical disc 7 to thereby detect, on the basis of the RF signal outputted from the matrix circuit 11, whether or not data is recorded on the optical disc 7 to deliver the detection signal to the CPU 24.

Figure 9:
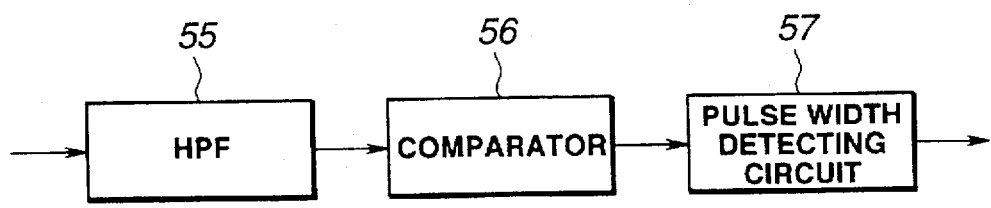
FIG. 9 is a view showing outline of the configuration of RF detecting circuit.
Figure 10:
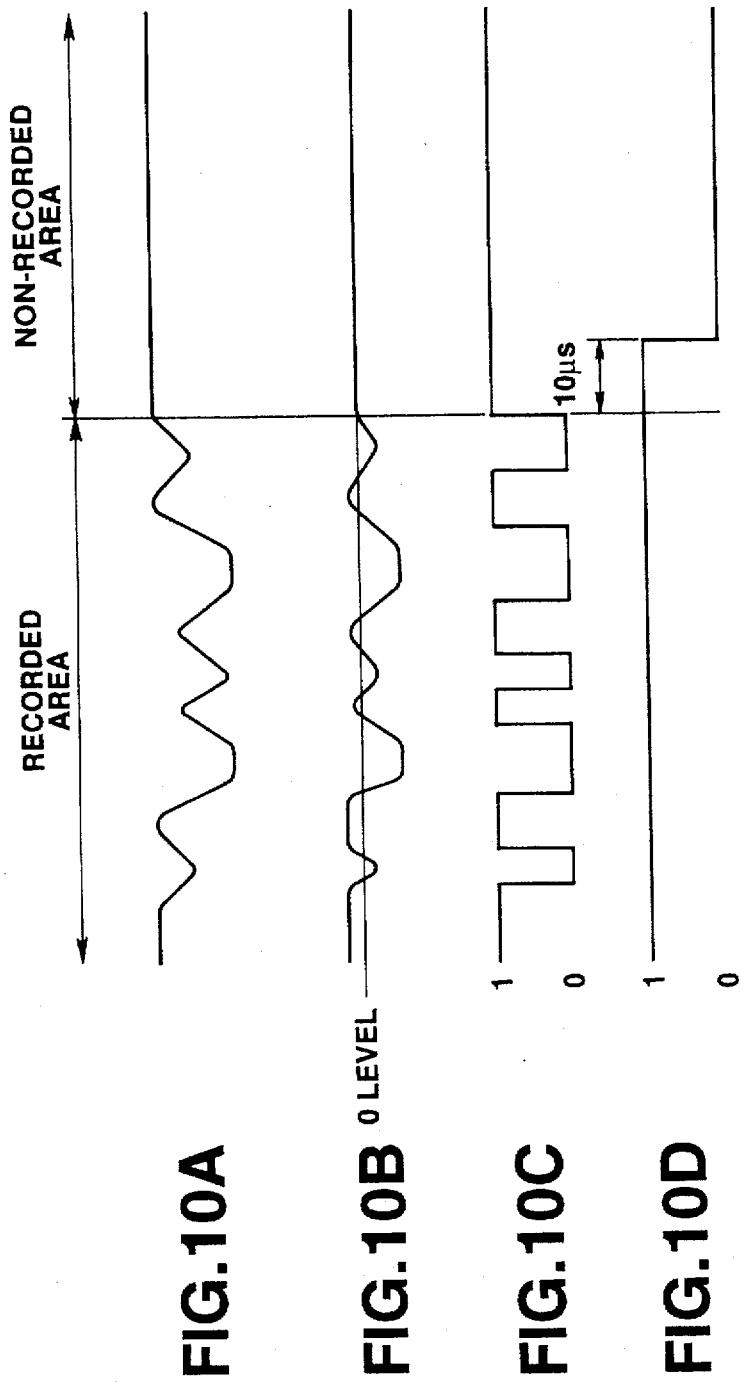
FIGS. 10A–10D are timing charts for explaining the operation of the RF detecting circuit.

Outline of the configuration of an embodiment of the RF detecting circuit 45 is shown in FIG. 9, and the timing chart of respective signals in the RF detecting circuit 45 is shown in FIG. 10. The operation of the RF detecting circuit 45 will be described below.

As indicated by A in FIG. 10, signal level of the RF signal reproduced from the recorded area where data are recorded changes, but signal level of the RF signal reproduced from the non (no data)-recorded area is substantially constant. This RF signal is caused to be passed through a high-pass filter (HPF) 55 shown in FIG. 9, whereby it is changed into such a signal indicated by B of FIG. 10 with 0 level being as the center. An output signal from the HPF55 is inputted to a comparator 56.

This comparator 56 slices the output signal by a predetermined slice level. Thus, as indicated by C of FIG. 10, there is obtained an output signal which becomes, in the recorded area, a binary signal to become logic "0" and "1" level corresponding to the signal of the pulse width of periods 3T~11T, and which has, in the non-recorded area, a pulse width longer than the period lit and is caused to be at logic "1" level at all times. This output signal is inputted to a pulse width detecting circuit 57.

A detection signal is outputted from the pulse width detecting circuit 57 such that when the pulse width of the binary signal is shorter than the period 11T, the detection signal is caused to be at logic "1" level indicating reproduction signal from the recorded area, while when the pulse width of the binary signal is longer than the period 11T, it is caused to be at logic "0" level indicating reproduction signal from the non-recorded area. This detection signal is indicated by D of FIG. 10.

In the data recording operation in this data recording apparatus, with respect to one OPC operation, one sub-partition obtained by dividing one partition within the test write area TA into plural sections is used.

Explanation will be given in more practical sense with reference to the flowchart shown in FIG. 11 in connection with a more practical embodiment of the data recording operation. It is to be noted that, in this embodiment, with respect to one OPC operation, there is assumed to be used a sub-partition consisting of 5 subcode frames obtained by dividing one partition consisting of 15 subcode frames of the test write area into three sections. Thus, 300 OPC operations can be carried out at the maximum.

Initially, on the basis of command from host computer (not shown) and/or command from input unit connected to the data recording apparatus, etc., preparatory operation, which will be described later, is carried out prior to recording data onto the optical disc 7, at step S1. Thereafter, at step S2, OPC operation of which detail will be described later is carried out to discriminate, at step S3, whether or not optimum laser drive power for recording is determined. If it is discriminated at the step S3 that the optimum laser drive power has been determined, the CPU 24 controls, at step S4, the APC circuit 31 so that the optimum laser drive power results to carry out recording of data.

At the time of data recording, switch 35 is switched to the terminal a side so that it is connected to a signal input terminal 43. From this signal input terminal 43, data for recording is inputted. This inputted recording data is encoded at a data encoder 28 through the switch 35. The data thus obtained is sent to the laser modulating circuit 29. This laser modulating circuit 29 drives the laser diode 1 by laser drive power based on the control signal from the APC circuit 31. Thus, recording of data is carried out.

Figure 12:
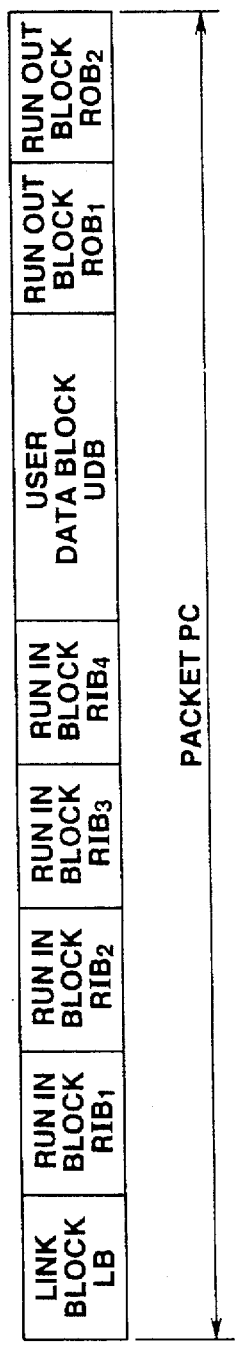
FIG. 12 is a view showing format of packet data.

The format of packet data recorded by the intratrack write-once operation, i.e., packet recording in this data recording apparatus is shown in FIG. 12. The data of one packet shown in FIG. 12 consists of link block LB of one sub code frame indicating interruption and start of data, Run-in blocks $RIB_1$, $RIB_2$, $RIB_3$, $RIB_4$ of four subcode frames for compensating read-out of data, user data block UDB in which music data etc. is recorded, and Run-out blocks $ROB_1$, $ROB_2$ of 2 subcode frames for compensating data recorded in a delayed manner in the area of the user data block UDB.

Figure 11:
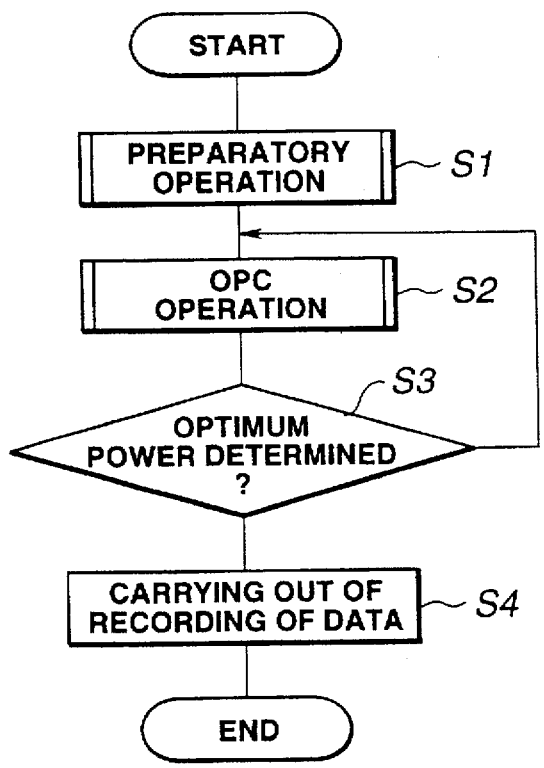
FIG. 11 is a flowchart of the procedure of the data recording operation.

Moreover, if it is discriminated at step S3 of FIG. 11 that recording optimum laser drive power is not determined, the processing operation returns to step S2 to carry out OPC operation for a second time to discriminate at step S3 whether or not the recording optimum laser drive power is determined. The operations at the steps S2 and S3 will be carried out until the optimum laser drive power is determined.

Figure 13:
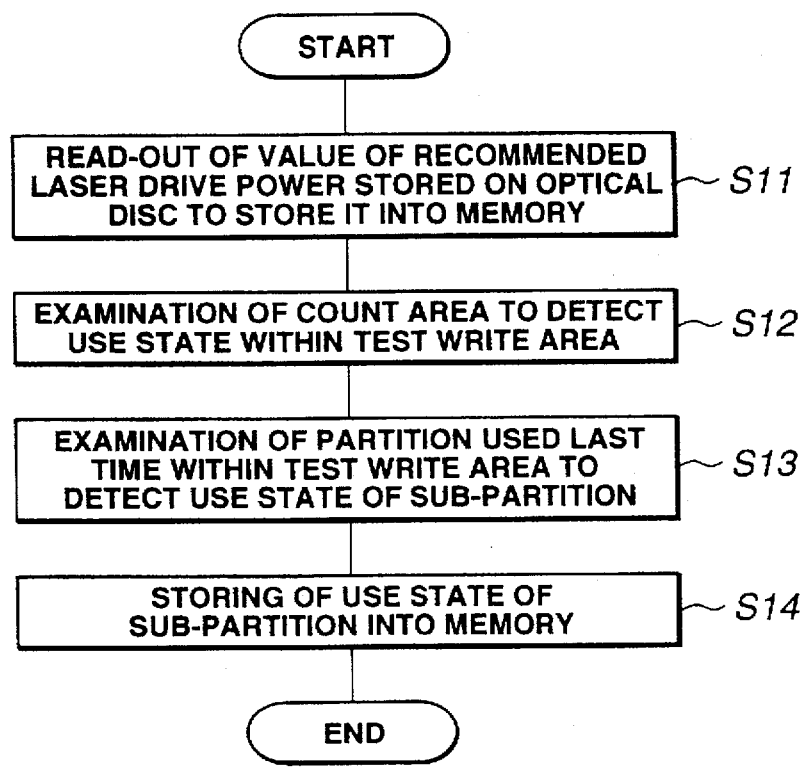
FIG. 13 is a flowchart of the procedure of preparatory operation.

The flowchart of more practical procedure of the preparatory operation is shown in FIG. 13.

Initially, at step S11 of FIG. 13, the CPU 24 reads out value of recommended laser drive power stored on the optical disc 7 to store it into a memory 47. Namely, the CPU 24 sends a control signal to the drive circuit 33 to thereby control the sled motor 34 to drive the sled mechanism 44 to move the optical pick-up 40 in the radial direction of the optical disc 7. Thus, the optical pick-up 40 is moved to the lead in area L1. Moreover, the CPU 24 sends a control signal to the APC circuit 31, whereby the laser diode 1 is driven by laser drive power for reproduction. Thus, data of the ATIP frame is reproduced by the optical pick-up 40. The value of the recommended laser drive power at the time of data recording is the value indicated by the value of bits 6–8 within minute MIN when combination of MSBs of minute MIN second SEC and frame No. FM of the ATIP frame are "1", "0", "1". This value is read out to store them into the memory 47.

At step S12, the optical pick-up 40 is moved to the count area CA by control from the CPU 24 to detect recording state of identification data of respective sub-areas, i.e., respective partitions within the count area CA to thereby detect use state of respective partitions within the test write area TA corresponding to respective partitions of the count area CA. In more practical sense, the partition which has been used last time and in which the test write data is recorded within the test write area TA is detected.

Further, at step S13, the CPU 24 detects use state of sub-partition within the partition of the detected test write area TA. It is to be noted that when data recording operation of this time is the first data recording operation, since no identification data is recorded in the count area CA, detections of use state of partition and use state of sub-partition within the test write area TA are not carried out.

Finally, at step S14, the CPU 24 stores use state of the detected sub-partition into the memory 47, and initializes use state of sub-partition within the test write area TA.

After the preparatory operation is carried out in this way, OPC operation is carried out.

Figure 14:
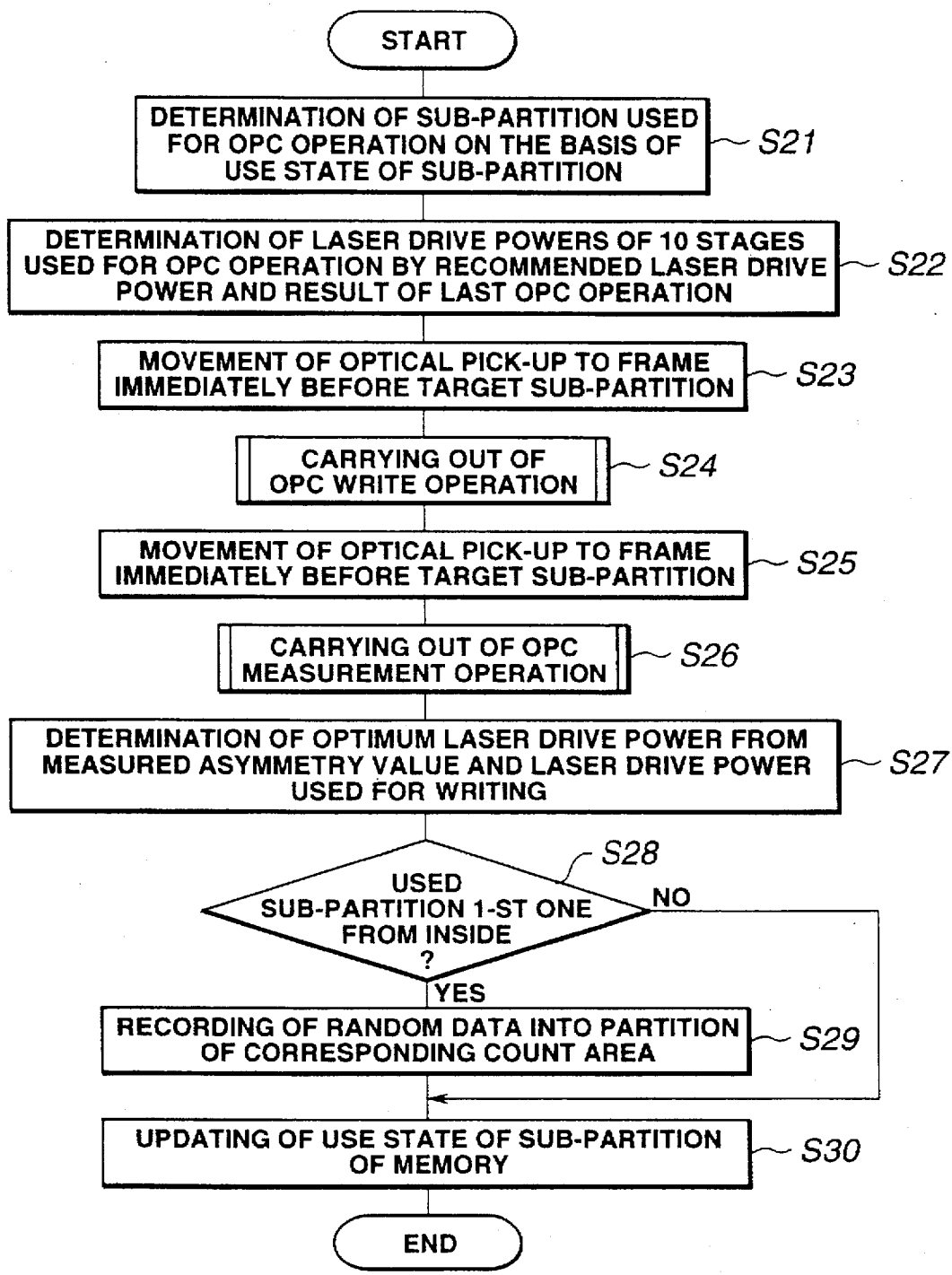
FIG. 14 is a flowchart of the procedure of the OPC operation.

The flowchart of the procedure of more practical operation of the OPC operation is shown in FIG. 14.

Initially, at step S21 of FIG. 14, the CPU 24 reads out use state of the sub-partition stored in the memory 47 to determine the sub-partition used fop the OPC operation.

Then, at step S22, laser drive power for recording of each stages used for the OPC operation is determined by the recommended laser drive power stored in the memory 47 and the result of the OPC operation at the time of data recording. It is to be noted that if the data recording operation is the first data recording operation, laser drive powers of respective stages are determined only by the recommended laser drive power.

In the conventional OPC operation, an approach is employed to vary the laser drive power at every respective subcode frames within one partition to carry out trial writing of the test write data. In this case, asymmetry values of recording signal of 15 stages can be measured. However, in the OPC operation utilizing the sub-partition, since one sub-partition consists of 5 sub-code frames, if laser drive power is changed at every sub-code frame, asymmetry values of recording signal of only 5 stages can be measured. In view of the above, a scheme is employed to also vary the laser drive power within one sub-code frame to carry out recording of test write data by using laser drive powers of five or more stages. Namely, for example, in the case where the laser drive power is changed at two stages with respect to one subcode frame to carry out recording of the test write data, laser drive powers for recording of 10 stages will be determined.

After the laser drive powers for recording of, for example 10 stages are determined, the optical pick-up 40 is moved to the subcode frame immediately before a target (objective) sub-partition for carrying out the trial writing by the control from the CPU 24 at step S23. Then, at step S24, the OPC write operation of the target sub-partition is carried out.

Figure 15:
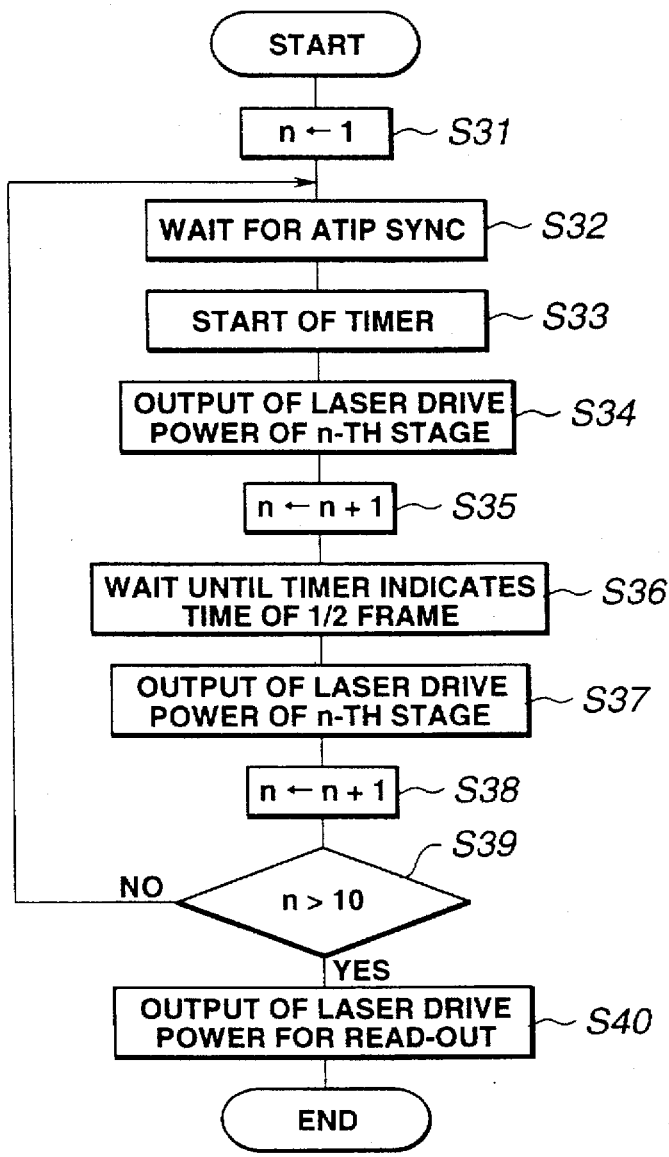
FIG. 15 is a flowchart of the procedure of the OPC write operation.

The flowchart of a more practical procedure of the OPC write operation is shown in FIG. 15.

In the OPC write operation shown in FIG. 15, initially, at step S31, 1 is substituted for n. Then, at step S32, the CPU 24 waits for input of SYNC of the ATIP frame, a so called ATIP SYNC. If the CPU 24 detects input of the ATIP SYNC, it starts a timer at step S33. Then, at step S34, the switch 35 is switched to the terminal b side by control from the CPU 24 so that it is connected to the memory 36, thus to read out test write data stored in the memory 36. This test write data is sent to the laser modulating circuit 29 through the data encoder 28. Moreover, the APC circuit 31 is controlled by control from the CPU 24 to drive it so as to output the recording laser drive power of the first stage from the laser diode 1. Thus, the test write data which is the random data is recorded into the area corresponding to the first ½ subcode frame of the first subcode frame.

Thereafter, at step S35, 1 is added to the variable n so that the added result is equal to 2. At step S36, the CPU 24 waits until the timer indicates the time of ½ subcode frame. Then, if the timer detects that the time of ½ subcode frame has been passed, the CPU 24 reads out, at step S37, test write data stored in the memory 36 to send it to the laser modulating circuit 29 to control the APC circuit 31 to drive it so as to output the recording laser drive power of the second stage from the laser diode 1. Thus, subsequent to the test write data recorded in the area of ½ subcode frame by the laser drive power of the first stage, test write data is recorded into the area of the remaining ½ subcode frame by the laser drive power of the second stage.

Thereafter, at step S39, whether or not the variable n is more than 10 is discriminated. At the stage where recording of the test write data by the laser drive power of the second stage is carried out, since it is discriminated that the variable n is not more than 10, the processing operation returns to the step S32 to wait for the input of ATIP SYNC of the next ATIP frame. Since the ATIP SYNC is outputted every ⅐₅ seconds which is the same as length of the subcode frame, the ATIP SYNC of the next ATIP frame is detected, thereby making it possible to detect the completion of the subcode frame. If the CPU 24 detects that the ATIP SYNC is inputted, it stops output of the recording laser drive power of the second stage to reset the timer.

Thereafter, at step S33, the timer is started for a second time. At step S34, the recording laser drive power of the third stage is outputted by control from the CPU 24 to record test write data into the area of the first ½ subcode frame of the second subcode frame.

Figure 16:
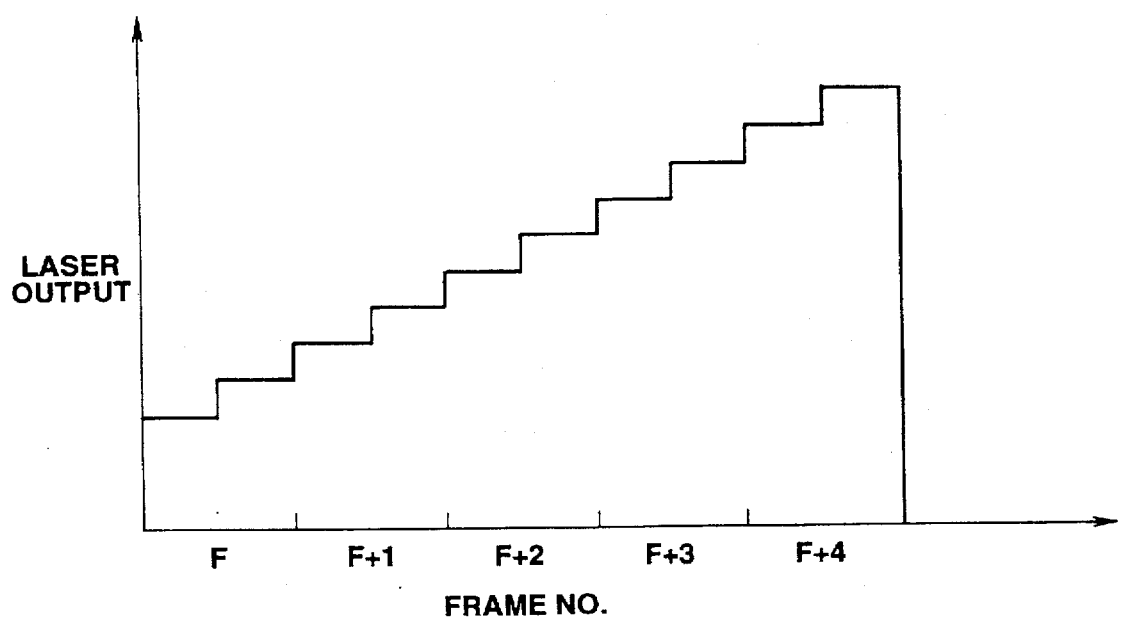
FIG. 16 is a view showing output of laser drive power with respect to respective subcode frames at the time of OPC operation.

As stated above, until it is discriminated at the step S39 that the variable n is more than 10, the processing operations from the step S32 up to the step S37 are carried out to carry out recording of test write data where the recording laser drive powers are successively changed. Thus, the recording laser drive power is changed every ½ subcode frame with respect to 5 subcode frames as shown in FIG. 16, thus making it possible to carry out recording of test write data by laser drive powers of 10 stages.

Thereafter, at step S40, the CPU 24 carries out a control so as to output a laser drive power for reproduction from the laser diode 1.

Then, at step S25 of FIG. 14, the CPU 24 moves the optical pick-up 40 to the subcode frame immediately before the target sub-partition. At step S26, the CPU 24 carries out OPC measurement operation of the target sub-partition.

Figure 17:
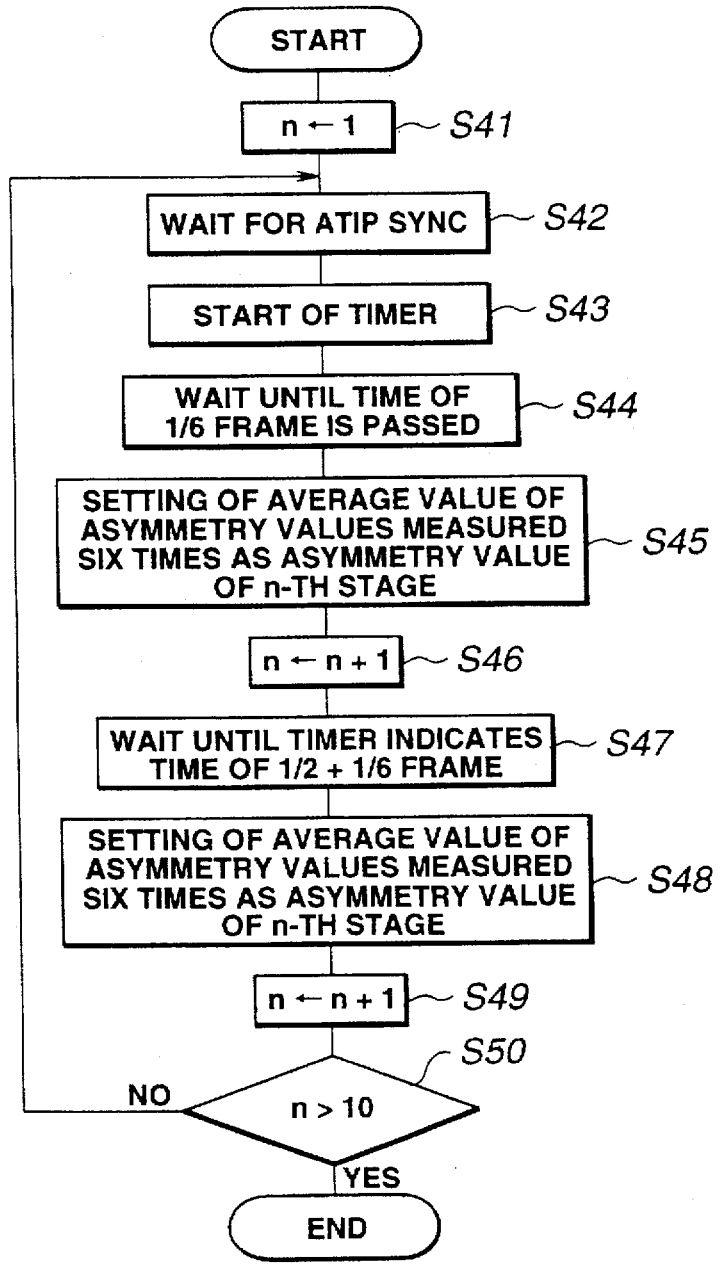
FIG. 17 is a flowchart of the procedure of OPC measurement operation.

The flowchart of the more practical procedure of the OPC measurement operation is shown in FIG. 17.

In the OPC measurement operation shown in FIG. 17, initially, at step S41, 1 is substituted for the variable n. Then, at step S42, the CPU 24 waits for input of the ATIP SYNC. If the CPU 24 detects input of the ATIP SYNC, it starts the timer at step S43. At step S44, the CPU 24 waits until the time when the optical pick-up 40 has been moved to the area where test write data is recorded in the state where the recording laser drive power is stabilized in the area where the test write data has been recorded by the recording laser drive power of the first stage. In this embodiment, the CPU 24 waits until the time required for allowing the optical pick-up to be moved to the position of 1/6 subcode frame is passed.

Then, if the CPU 24 detects that the timer indicates passage of the time of 1/6 subcode frame, it carries out, at step S45, a control so as to successively read out six times test write data recorded by the recording laser drive power of the first stage. For example, in the case where it takes 150 μsec. for one (each) data read-out operation, it will take 900 μsec for six data read-out operations.

By this read-out operation, RF signals of read-out data of six times of operations are outputted from the matrix circuit 11. These RF signals are outputted to the asymmetry detecting circuit 46. This asymmetry detecting circuit 46 detects asymmetry values of respective RF signals to send them to CPU 24. The CPU 24 takes an average value of asymmetry values of read-out data of six times of operations to set the average value thus obtained as the asymmetry value of the first stage.

It is to be noted that the asymmetry detecting circuit 46 must be a high speed detecting circuit capable of sequentially detecting by 5 subcode frames, asymmetry values of data read out six times every 1/2 subcode frame.

At step S46, 1 is added to the variable n so that the added result is equal to 2. At step S47, the CPU 24 waits until the timer indicates passage of the time of 1/2+1/6 subcode frame. If the CPU 24 detects that the timer indicates passage of the time of 1/2+1/6 subcode frame, it moves the optical pick-up 40 up to the position of 1/6 subcode frame within the area of 1/2 subcode frame where test write data is recorded by the recording laser drive power of the second stage. Thereafter, at step S48, read-out operations of test write data are carried out six times similarly to the step S45 by control from the CPU 24 to detect respective asymmetry values to take an average thereof to set the average value thus obtained as the asymmetry value of the second stage.

At step S49, 1 is added to the variable n. At step S50, whether or not the value of the variable n is more than 10 is discriminated. Since it is discriminated that the variable n is not more than 10 at the stage where the asymmetry value of the second stage is set, the processing operation returns to the step S42 to wait for ATIP SYNC of the next ATIP frame. Since the ATIP SYNC is outputted every 1/75 sec. which is the same as length of the subcode frame, the ATIP SYNC of the next ATIP frame is detected, thereby making it possible to detect termination (end) of the subcode frame. If the CPU 24 detects that the ATIP SYNC is inputted, it resets the timer.

Thereafter, at step S43, the timer is started for a second time to carry out processing operations from the step S44 up to the step S48 to set asymmetry values corresponding to two stages.

Until it is discriminated at step S50 that the variable n is more than 10, processing operations from the step S42 up to the step S48 are carried out to set asymmetry values of 10 stages.

Thereafter, at step S27 of FIG. 14, the CPU 24 determines an optimum laser drive power for recording from the asymmetry values of 10 stages and the recording laser drive power used at the time of recording test write data. In more practical sense, e.g., asymmetry values of 10 stages are used to determine a regression line of asymmetry values within +10 to −10% and the recording laser drive power to determine, as an optimum laser drive power, from the regression line, a recording laser drive power for obtaining the optimum asymmetry value, e.g., the asymmetry value which becomes 0%. By interpolating respective stages of the recording laser drive power in this way, it is possible to improve accuracy of the OPC operation.

At step S28, whether or not the sub-partition used for the OPC operation is first one from the inner circumferential side within the partition including the sub-partition is discriminated.

If it is discriminated that the above-mentioned sub-partition is not the first sub-partition, since identification data indicating that corresponding partition within the test write area TA has been used has been already recorded in the partition within the count area CA corresponding to the partition within the test write area TA including sub-partition used for the OPC operation, i.e., one subcode frame, the processing operation proceeds to step S30 to update use state of the sub-partition within the memory 47, thus to complete the OPC operation.

Moreover, if it is identified by identification of the step S28 that the sub-partition used for the OPC operation is the first sub-partition, the processing operation proceeds to step S29 to move, by control from the CPU 24, the optical pick-up 40 to the partition within the count area CA corresponding to the partition within the test write area TA including the sub-partition used for the OPC operation to control the APC circuit 31 to drive the laser diode 1 by the optimum laser drive power for recording to thereby record random data as identification data.

Even in the case where only one sub-partition is used in one partition within the test write area TA as stated above, identification data is recorded into the partition within the count area CA corresponding to the partition within the test write area TA including the used sub-partition to indicate that the partition within the test write area TA has been already used. Thus, it is possible to maintain compatibility between the optical disc on which data are recorded by the conventional OPC operation and the optical disc on which data are recorded by the OPC operation by the data recording apparatus of this invention.

It is to be noted while explanation has been given in the above-described embodiment in connection with the case where one partition of the test write area TA is divided into three sections to use one sub-partition consisting of 5 subcode frames, the number of divisions of one partition is not limited to three (3). In addition, while explanation has been given in connection with the case where the number of stages of the laser drive power varied within one subcode frame is set to two (2), the number of stages is not limited to two (2) also in this case.

Accordingly, at another embodiment, e.g., it is conceivable to divide one partition of the test write area TA into five sections to allow one sub-partition to consist of three subcode frames, and to set the number of stages of the recording laser drive power varied within one subcode frame to three (3).

In the OPC write operation of the above-mentioned another embodiment, test write data are recorded respectively by 1/3 subcode frame by different recording laser drive powers of three stages with respect to one sub-code frame. Accordingly, an approach is employed to wait by the timer until it indicates the time of ⅓ subcode frame. Moreover, with respect to the variable n, whether or not the variable n is 9 or more is discriminated. Further, in the OPC measurement operation, read-out operation of data is carried out from the position of ⅙ subcode frame within the area of respective ⅓ subcode frames. Namely, within one sub-partition, read-out operation of test write data by the first recording laser drive power is carried out from the position corresponding to ⅟₁₈ subcode frame; read-out operation of test write data by the second recording laser drive power is carried out from the position corresponding to ⅓+⅟₁₈ subcode frame; and read-out operation of test write data by the third recording laser drive power is carried out from the position corresponding to ⅔+⅟₁₈ subcode frame.

In the above-mentioned another embodiment, it is possible to carry out 500 OPC operations at the maximum. Moreover, since test write data are recorded by different recording laser drive powers of 9 stages in the single OPC operation, it is possible to obtain the number of asymmetry values necessary for obtaining the optimum asymmetry value.

The above-mentioned configuration is employed to divide a partition within the test write area on the optical disc into a plurality of sub-partitions to record test write data by different plural recording laser drive powers within respective subcode frames constituting the sub-partitions to determine an optimum laser drive power for recording from an average value of asymmetry values obtained by reproducing respective data recorded by the plurality of laser drive powers, thereby making it possible to carry out OPC operations more than 100 which is the maximum number of OPC operations in the prior art. Accordingly, also in the case where data recording operations more than the maximum number of data recording operations in the prior art, i.e., 100 OPC operations are carried out, it is possible to maintain quality of the recording data. Particularly, in the packet recording, there are instances where the number of data recording operations reaches more than 100. Accordingly, it is possible to maintain quality of the recording data in such cases. In addition, it is possible to determine precise recording laser drive power.

What is claimed is:

1. A data recording apparatus comprising:

laser irradiating means for irradiating laser beams with respect to an optical recording medium;

laser driving means for driving the laser irradiating means;

moving means for relatively moving the laser irradiating means with respect to the optical recording medium; and control means for controlling the laser driving means and the moving means so that test write data are recorded by different plural laser drive powers within each subcode frame of a test write area including the plural subcode frames within the optical recording medium by the laser irradiating means.

2. A data recording apparatus as set forth in claim 1, wherein the test write area comprises a plurality of partitions constituted with the plurality of subcode frames, and the optical recording medium further comprises a count area having a plurality of sub-areas respectively associated with the plurality of partitions of the test write area, and wherein the control means controls the laser driving means and the moving means so as to record identification data indicating that the partition has been already used into the sub-area within the count area associated with the partition into which the test write data is recorded.

3. A data recording apparatus as set forth in claim 2, wherein the respective sub-areas constituting the count area are an area of the one subcode frame.

4. A data recording apparatus as set forth in claim 2, further comprising:

light receiving means for receiving laser beams reflected from the optical recording medium; and detecting means for detecting presence or absence of recording of identification data of the count area in accordance with an output from the light receiving means;

wherein the control means controls the laser driving means and the moving means on the basis of a detection result from the detecting means so as to record test write data into the sub-area, which is not yet recorded, of the test write area.

5. A data recording apparatus as set forth in claim 4, wherein the control means controls the detecting means to detect whether or not identification data is recorded in the sub-area within the count area associated with the partition including a certain subcode frame prior to recording of the test write data into said subcode frame within the test write area, and controls the laser driving means and the moving means so as to record identification data into the sub-area within the count area associated with the partition including the subcode frame into which the test write data is to be recorded when no identification data is recorded in the sub-area.

6. A data recording apparatus as set forth in claim 2, wherein the partition of the test write area includes a plurality of sub-partitions, the apparatus further comprising memory means for detecting recording state of identification data of the sub-area within the count area to detect use state of the sub-partition within the partition of the test write area on the basis of the detected recording state to store use state of the detected sub-partition.

7. A data recording apparatus as set forth in claim 2, wherein the control means controls the laser driving means and the moving means to record identification data into the sub-area within the count area associated with the partition including a certain subcode frame after test write data is recorded into the subcode frame.

8. A data recording apparatus as set forth in claim 1, further comprising:

light receiving means for receiving laser beams reflected from the optical recording medium; and reproducing means for reproducing, on the basis of an output from the light receiving means, synchronization signals recorded every predetermined unit on the optical recording medium and data recorded on the optical recording medium;

wherein the control means controls the laser driving means so that the laser drive power is changed stepwise at a time interval which is substantially 1/N (N is integer equal to 2 or more) of a time interval between successive two synchronization signals on the basis of an output from the reproducing means.

9. A data recording apparatus as set forth in claim 8, wherein the synchronization signal obtained from the reproducing means is included in an absolute address information signal recorded in advance on the optical recording medium.

10. A data recording apparatus as set forth in claim 8, wherein the control means resets variable timing of the laser drive power in accordance with timing of the synchronization signal obtained from the reproducing means.

11. A data recording apparatus as set forth in claim 1, further comprising:

light receiving means for receiving laser beams reflected from the optical recording medium; and asymmetry detecting means for detecting, on the basis of an output of the test write data recorded in the test write area from the light receiving means, an asymmetry value of the test write data;

wherein the control means controls laser drive power provided to the laser driving means on the basis of an output from the asymmetry value detecting means when recording data onto the optical recording medium.

12. A data recording apparatus comprising:

laser irradiating means for irradiating laser beams with respect to an optical recording medium having a test write area including a plurality of partitions constituted with a plurality of subcode frames;

laser driving means for driving the laser irradiating means;

moving means for relatively moving the laser irradiating means with respect to the optical recording medium; and control means for controlling the laser driving means and the moving means so as to record test write data by a plurality of laser drive powers different from each other within each sub-partition of one partition including the plurality of sub-partitions within the test write area.

13. A data recording apparatus as set forth in claim 12, wherein the optical recording medium further comprises a count area including a plurality of sub-areas respectively associated with the plurality of partitions of the test write area, and wherein the control means controls the laser driving means and the moving means so as to record identification data indicating that the partition has been already used into the sub-area within the count area associated with the partition into which the test write data is recorded.

14. A data recording apparatus as set forth in claim 13, further comprising:

light receiving means for receiving laser beams reflected from the optical recording medium; and detecting means for detecting presence or absence of recording of identification data of the count area in accordance with an output from the light receiving means;

wherein the control means controls the laser driving means and the moving means on the basis of a detection result from the detecting means so as to record test write data into the sub-area, which is not yet recorded, of the test write area.

15. A data recording apparatus as set forth in claim 14, wherein the control means controls the detecting means to detect whether or not identification data is recorded in the sub-area within the count area associated with the partition including a certain subcode frame prior to recording of the test write data into said subcode frame within the test write area, and controls the laser driving means and the moving means so as to record identification data into the sub-area within the count area associated with the partition including the subcode frame into which the test write data is to be recorded when no identification data is recorded in the sub-area.

16. A data recording apparatus as set forth in claim 13, further comprising memory means for detecting recording state of identification data of the sub-area within the count area to detect use state of the sub-partition within the partition of the test write area on the basis of the detected recording state to store use state of the detected sub-partition.

17. A data recording apparatus as set forth in claim 12, further comprising:

light receiving means for receiving laser beams reflected from the optical recording medium; and reproducing means for reproducing, on the basis of an output from the light receiving means, synchronization signals recorded every predetermined unit on the optical recording medium and data recorded on the optical recording medium;

wherein the control means controls the laser driving means so that the laser drive power is changed stepwise at a time interval which is substantially 1/N (N is integer equal to 2 or more) of a time interval between successive two synchronization signals on the basis of an output from the reproducing means.

18. A data recording apparatus as set forth in claim 12, further comprising:

light receiving means for receiving laser beams reflected from the optical recording medium; and asymmetry detecting means for detecting, on the basis of an output of test write data recorded in the test write area from the light receiving means, an asymmetry value of the test write data;

wherein the control means controls laser drive power provided to the laser driving means on the basis of an output from the asymmetry value detecting means when recording data onto the optical recording medium.

19. A data recording apparatus comprising:

laser irradiating means for irradiating laser beams with respect to an optical recording medium;

laser driving means for driving the laser irradiating means;

moving means for relatively moving the laser irradiating means with respect to the optical recording medium; and control means for controlling the laser driving means and the moving means so that test write data are recorded by different plural laser drive powers within each sub-area of a test write area including the plurality of sub-areas within the optical recording medium by the laser irradiating means.

20. A data recording apparatus as set forth in claim 19, wherein the test write area includes a plurality of divided areas constituted with a plurality of sub-areas, and the optical recording medium further comprises a count area including a plurality of sub-areas respectively associated with the plurality of divided areas of the test write area, wherein the control means controls the laser driving means and the moving means so as to record identification data indicating that the divided area has been already used into the sub-area within the count area associated with the divided area into which the test write data is recorded.

21. A data recording apparatus as set forth in claim 20, wherein the respective sub-areas constituting the count area are an area of one sub-area of the test write area.

22. A data recording apparatus as set forth in claim 20, further comprising:

light receiving means for receiving laser beams reflected from the optical recording medium; and detecting means for detecting presence or absence of recording of identification data of the count area in accordance with an output from the light receiving means;

wherein the control means controls the detecting means to detect whether or not identification data is recorded in the sub-area within the count area associated with the divided area including a certain sub-area prior to recording of the test write data into said sub-area within the test write area, and controls the laser driving means and the moving means so as to record identification data into the sub-area within the count area associated with the divided area including the sub-area into which the test write data is to be recorded when no identification data is recorded in the sub-area.

23. A data recording apparatus as set forth in claim 19, further comprising:

light receiving means for receiving laser beams reflected from the optical recording medium; and reproducing means for reproducing, on the basis of an output from the light receiving means, synchronization signals recorded every predetermined unit on the optical recording medium and data recorded on the optical recording medium;

wherein the control means controls the laser driving means so that the laser drive power is changed stepwise at a time interval which is substantially 1/N (N is integer equal to 2 or more) of a time interval between successive two synchronization signals on the basis of an output from the reproducing means.

24. A data recording apparatus as set forth in claim 19, further comprising:

light receiving means for receiving laser beams reflected from the optical recording medium; and asymmetry detecting means for detecting, on the basis of an output of test write data recorded in the test write area from the light receiving means, an asymmetry value of the test write data;

wherein the control means controls laser drive power provided to the laser driving means on the basis of an output from the asymmetry value detecting means when recording data onto the optical recording medium.

* * * * *